(12) United States Patent
Lu et al.

(10) Patent No.: US 9,176,603 B2
(45) Date of Patent: *Nov. 3, 2015

(54) INTERACTIVE POINTING DEVICE CAPABLE OF SWITCHING CAPTURE RANGES AND METHOD FOR SWITCHING CAPTURE RANGES

(75) Inventors: Chih Hung Lu, Hsinchu (TW); En Feng Hsu, Hsinchu (TW); Hsin Chia Chen, Hsinchu (TW); Chao Chien Huang, Hsinchu (TW); Cho Yi Lin, Hsinchu (TW)

(73) Assignee: PIXART IMAGING INC., Hsinchu (TW)

( * ) Notice: Subject to any disclaimer, the term of this patent is extended or adjusted under 35 U.S.C. 154(b) by 1084 days.

This patent is subject to a terminal disclaimer.

(21) Appl. No.: 12/880,557

(22) Filed: Sep. 13, 2010

(65) Prior Publication Data

US 2011/0316773 A1  Dec. 29, 2011

(30) Foreign Application Priority Data

Jun. 23, 2010  (TW) ............................... 99120484 A

(51) Int. Cl.
| G06F 3/0354 | (2013.01) |
| G06F 3/03 | (2006.01) |
| G06F 3/0346 | (2013.01) |
| G06F 3/038 | (2013.01) |

(52) U.S. Cl.
CPC .......... *G06F 3/03542* (2013.01); *G06F 3/0304* (2013.01); *G06F 3/0346* (2013.01); *G06F 3/0383* (2013.01)

(58) Field of Classification Search
CPC ................ G06F 3/0488; G06F 3/0487; G06F 2203/04806; H04N 5/2258; H04N 5/23293
USPC .......................... 345/157–159, 162, 166, 169
See application file for complete search history.

(56) References Cited

U.S. PATENT DOCUMENTS

| 6,396,962 | B1 * | 5/2002 | Haffey et al. ................. 382/298 |
| 6,791,700 | B2 * | 9/2004 | Omura et al. ................. 345/157 |
| 8,144,123 | B2 * | 3/2012 | Denoue et al. ................ 345/157 |
| 2006/0033822 | A1 * | 2/2006 | Lee et al. .................... 348/222.1 |
| 2007/0046804 | A1 * | 3/2007 | Hirano et al. ............. 348/333.01 |
| 2008/0117167 | A1 * | 5/2008 | Aonuma et al. .............. 345/157 |
| 2009/0052730 | A1 * | 2/2009 | Lin ............................... 382/100 |
| 2009/0202148 | A1 * | 8/2009 | Eisen ........................... 382/167 |
| 2010/0020201 | A1 * | 1/2010 | Chao et al. .................... 348/239 |
| 2011/0163966 | A1 * | 7/2011 | Chaudhri ...................... 345/173 |

* cited by examiner

*Primary Examiner* — Gerald Johnson
(74) *Attorney, Agent, or Firm* — Locke Lord LLP; Tim Tingkang Xia, Esq.

(57) ABSTRACT

An interactive pointing device capable of switching capture ranges includes an image capturing element and a processing unit. The image capturing element is used for capturing an optical signal, and outputting an image signal. The processing unit is used for determining a switching signal, and responsible for processing and analyzing the image signal. Through the determination about the switching signal and the coordinate conversion of the image signal by an arithmetic unit, the interactive pointing device capable of switching capture ranges is enabled to be operable in hosts with different resolutions.

21 Claims, 7 Drawing Sheets

INTERACTIVE POINTING DEVICE CAPABLE OF SWITCHING CAPTURE RANGES AND METHOD FOR SWITCHING CAPTURE RANGES

CROSS-REFERENCE TO RELATED APPLICATIONS

This non-provisional application claims priority under 35 U.S.C. §119(a) on Patent Application No(s). 099120484 filed in Taiwan, R.O.C. on Jun. 23, 2010, the entire contents of which are hereby incorporated by reference.

BACKGROUND OF THE INVENTION

1. Field of the Invention

The present invention relates to an interactive pointing device and a corresponding method, and more particularly to an interactive pointing device capable of switching capture ranges and a method for switching capture ranges.

2. Related Art

In recent years, with the rapid development of technologies, interactive multimedia devices become more and more popular. The interactive multimedia devices allow users to interact with sounds and images, so as to experience entertainment.

A control device is required to be used in combination with the interactive multimedia device. In addition to control devices for control through buttons, more advanced control devices are further equipped with technologies of pointing and motion sensing. Pointing is used to control a cursor on a screen as a mouse, and motion sensing is used to detect movement and rotation in three-dimensional space.

The pointing technology needs to use an image sensing element to detect a direction pointed by the control device. However, the image sensing element of the control device in the prior art can only output a fixed coordinate format. That is to say, the conventional control device can only be used in combination with a special host. If it is intended to use the control device on hosts of different specifications, for example, hosts with different resolutions, the cursor may be displayed at different positions due to the different coordinate formats. For example, in a host with a resolution of 720×480, if the cursor is in a corner of a frame, the corresponding coordinates are (720,480). However, if the same coordinates (720,480) are mapped to a host with a resolution of 1280× 720, the displayed coordinates fall at a central position of the frame. That is to say, the conventional control device can only be corresponding to a host with a single resolution, and cannot support hosts with different resolutions.

SUMMARY OF THE INVENTION

Accordingly, the present invention is an interactive pointing device capable of switching capture ranges, which can solve the problem in the prior art that control devices with different resolutions cannot be supported.

The interactive pointing device capable of switching capture ranges of the present invention comprises an image capturing element and a processing unit. The image capturing element is used for capturing an optical signal, and outputting an image signal. The image capturing element operates in a first capture range or a second capture range. The first capture range comprises the second capture range.

The processing unit controls the capture ranges according to a switching signal. The switching signal is divided into a first mode or a second mode. When the switching signal is in the first mode, the processing unit controls the image capturing element to capture the optical signal with the first capture range, and converts the image signal captured by the image capturing element into a first coordinate data. When the switching signal is in the second mode, the processing unit controls the image capturing element to capture the optical signal with the second capture range, and converts the image signal captured by the image capturing element into a second coordinate data.

In another embodiment, the interactive pointing device capable of switching capture ranges of the present invention comprises an image capturing element and a processing unit. The image capturing element is used for capturing an optical signal, and outputting an image signal. A switching signal is divided into a first mode or a second mode. The processing unit controls the image capturing element to capture the optical signal. When the switching signal is in the first mode, the processing unit converts the image signal into a first coordinate data, and when the switching signal is in the second mode, the processing unit converts the image signal into a first coordinate data.

According to an embodiment of the present invention, when the switching signal is in the second mode, the processing unit converts the image signal into the first coordinate data, and then converts the first coordinate data into the second coordinate data.

A method for switching capture ranges for use in an interactive pointing device of the present invention comprises the following steps.

An image capturing element and a processing unit are provided. A switching signal is received, and it is determined whether the switching signal is in a first mode or a second mode. An optical signal is captured by using the image capturing element, in which when the switching signal is in the first mode, the image capturing element captures the optical signal with a first capture range, and when the switching signal is in the second mode, the image capturing element captures the optical signal with a second capture range. The optical signal is converted into an image signal. When the switching signal is in the first mode, the processing unit outputs a first coordinate data according to the image signal, and when the switching signal is in the second mode, the processing unit outputs a second coordinate data according to the image signal.

Based on the interactive pointing device capable of switching capture ranges, during operation, with the image signal captured by the image capturing element, and through the determination about the switching signal and the calculation and conversion of the first coordinates or the second coordinates by an arithmetic unit, the interactive pointing device capable of switching capture ranges is enabled to be operable in hosts with different resolutions. Switching of different resolutions is corresponding to the television cursor viewed by the user, and no difference exists in switching.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

The detailed features and advantages of the present invention are described below in great detail through the following embodiments, the content of the detailed description is sufficient for those skilled in the art to understand the technical content of the present invention and to implement the present invention there accordingly. Based upon the content of the specification, the claims, and the drawings, those skilled in the art can easily understand the relevant objectives and advantages of the present invention.

Figure 1:
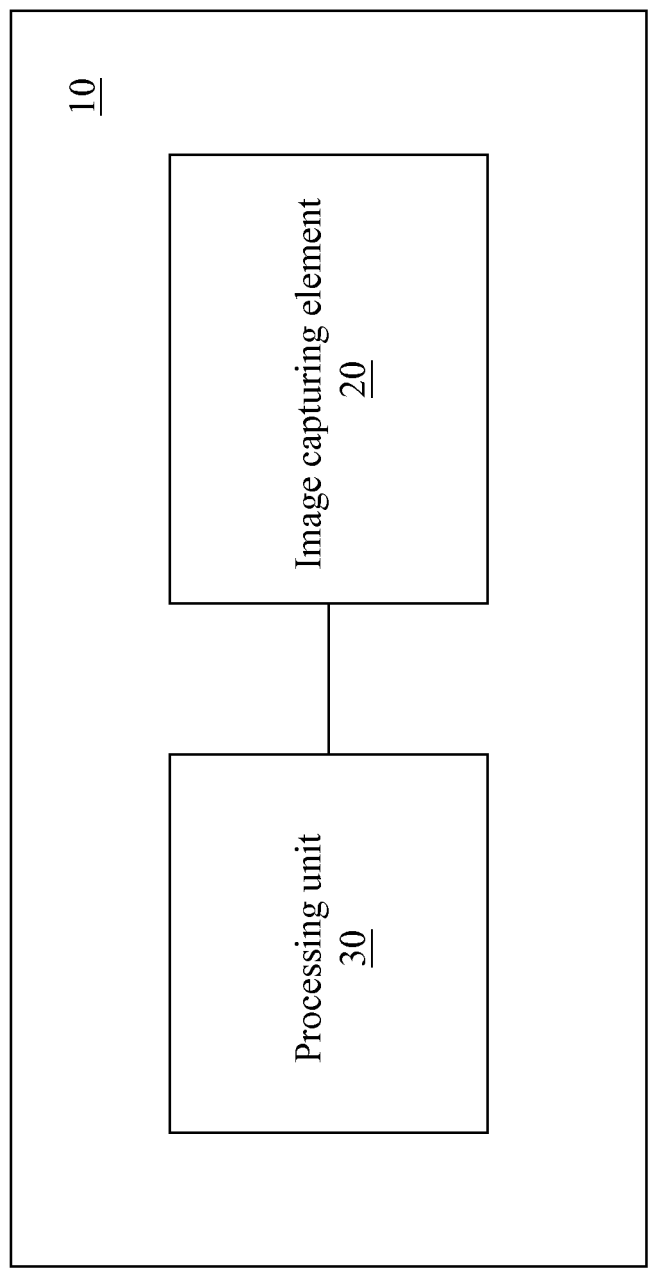
FIG. 1 is a block architecture diagram of a first embodiment of an interactive pointing device according to the present invention.

FIG. 1 is a block architecture diagram of a first embodiment of an interactive pointing device according to the present invention. Referring to FIG. 1, an interactive pointing device 10 comprises an image capturing element 20 and a processing unit 30.

The image capturing element 20 is used for capturing an optical signal, and outputting an image signal. The image capturing element 20 may be a charge-coupled device (CCD) or a complementary metal-oxide-semiconductor (CMOS).

The processing unit 30 is electrically connected to the image capturing element 20, and is used for receiving the image signal from the image capturing element 20. The processing unit 30 compares the image signals output by the image capturing element 20 at different time points, processes and analyzes the image signals according to a switching signal, and generates first coordinates or second coordinates.

The processing unit 30 may generate the first coordinates or the second coordinates through the following two methods: (I) switching capture ranges of the image capturing element 20; and (II) using coordinate numeric conversion.

Figure 2:
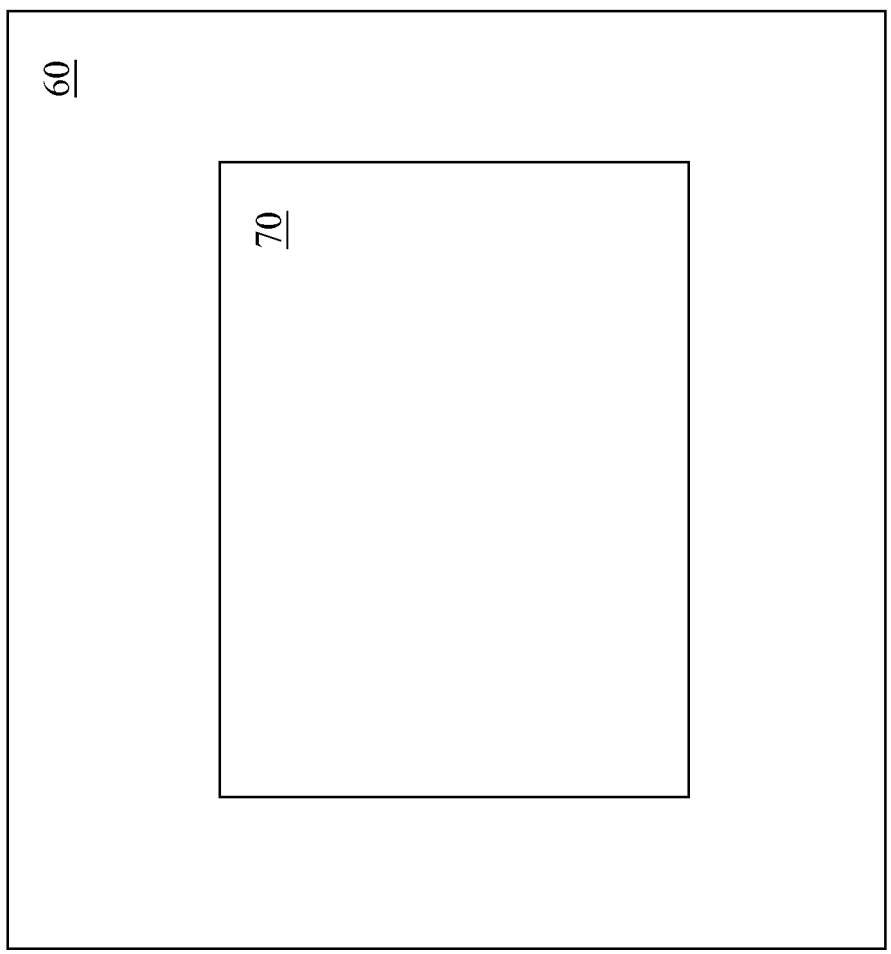
FIG. 2 is a schematic view of capture ranges of an image capturing element according to the present invention.

For the first method, reference is made to FIG. 2, which is a schematic view of capture ranges of an image capturing element according to the present invention.

When capturing the optical signal, the image capturing element 20 may operate in a first capture range 60 or a second capture range 70. The first capture range 60 comprises the second capture range 70. For example, the range corresponding to the first capture range 60 is 160×160 pixels, and the range corresponding to the second capture range 70 is 96×128 pixels.

When the switching signal is in a first mode, the processing unit 30 controls the image capturing element 20 to capture the optical signal with the first capture range 60, and converts the image signal captured by the image capturing element 20 into a first coordinate data. When the switching signal is in a second mode, the processing unit 30 controls the image capturing element 20 to capture the optical signal with the second capture range 60, and converts the image signal captured by the image capturing element 20 into a second coordinate data.

The second method is using coordinate numeric conversion. When the switching signal is in the first mode, the processing unit 30 converts the image signal captured by the image capturing element 20 into the first coordinate data. When the switching signal is in the second mode, the image capturing element 20 still captures the optical signal with the first capture range 60. As the processing unit 30 must generate the second coordinate data in the second mode, the processing unit 30 converts the image signal captured by the image capturing element 20 into the first coordinate data, and then converts the first coordinate data into the second coordinate data through coordinate numeric conversion.

For example, through the coordinate numeric conversion, a first coordinate data (X,Y) is converted into a second coordinate data (X−ΔX,Y−ΔY) or (X/$C_X$,Y/$C_Y$). That is to say, the second coordinate data is a result of the first coordinate data after translation or contraction.

Figure 3:
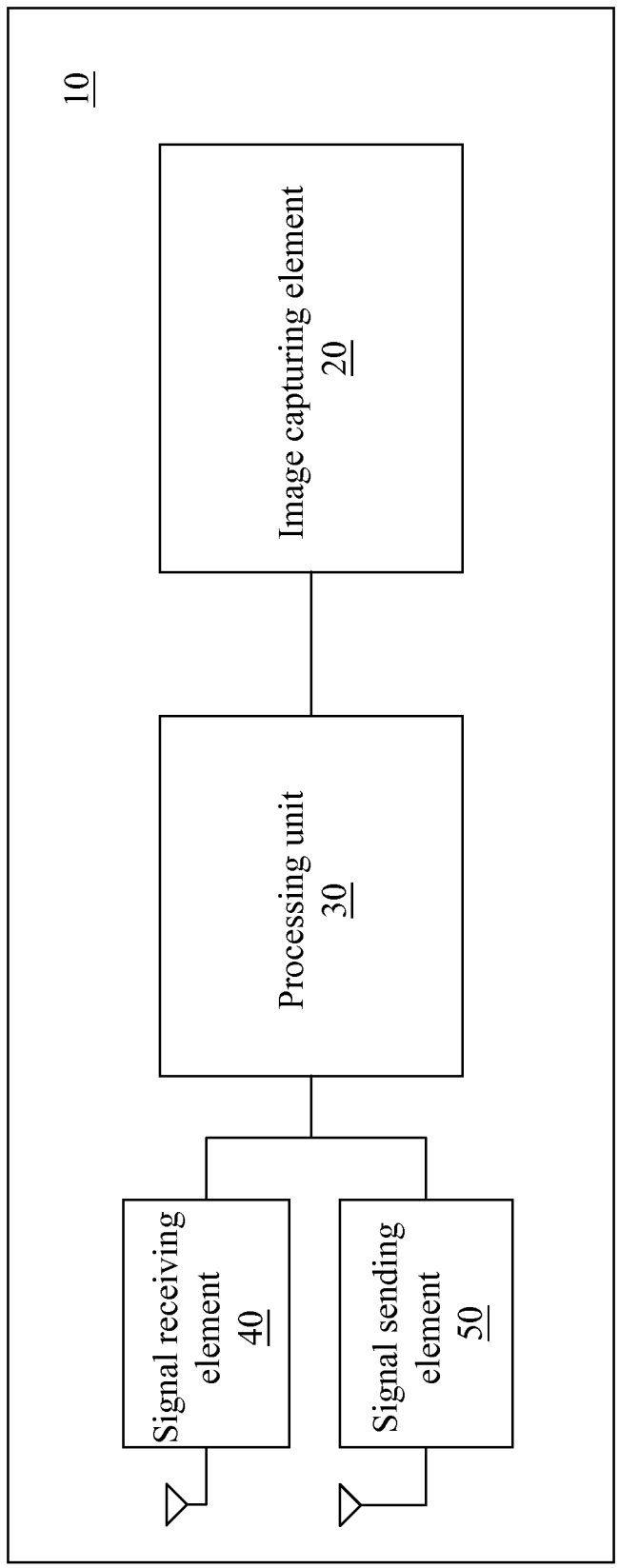
FIG. 3 is a block architecture diagram of a second embodiment of the interactive pointing device according to the present invention.

FIG. 3 is a block architecture diagram of a second embodiment of the interactive pointing device according to the present invention. Referring to FIG. 3, an interactive pointing device 10 comprises an image capturing element 20, a processing unit 30, a signal receiving element 40, and a signal sending element 50.

The signal receiving element 40 is electrically connected to the processing unit 30. The signal receiving element 40 is used for receiving a switching signal. The switching signal may be, for example, a type of a host. After determining the type of the host, the processing unit 30 decides to output first coordinates or second coordinates.

The signal sending element 50 is electrically connected to the processing unit 30, such that the first coordinates or the second coordinates can be transmitted to a computer host through the signal sending element 50.

In this embodiment, the signal receiving element 40 and the signal sending element 50 may be wired or wireless signal transceiver elements, for example, wireless transmission elements conforming to Bluetooth specifications.

Figure 4:
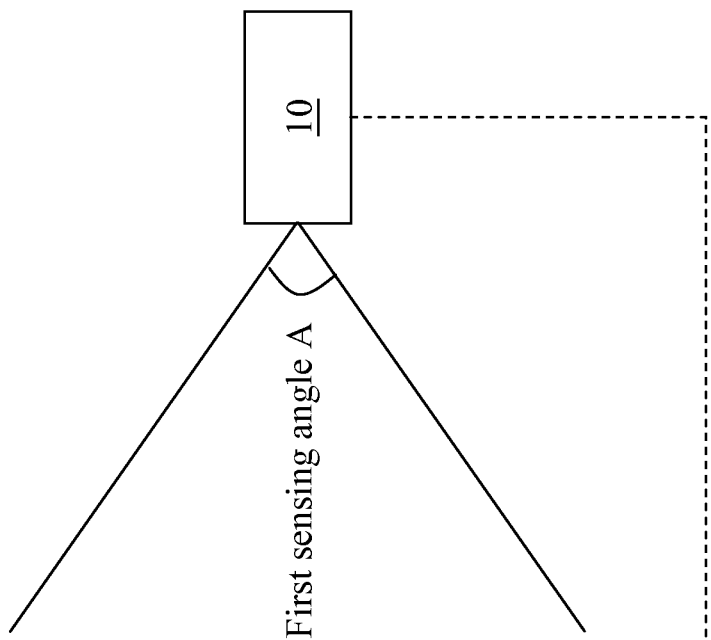
FIG. 4 is a schematic view of a first embodiment of an application of the pointing device of the present invention in an interactive system.
Figure 4:
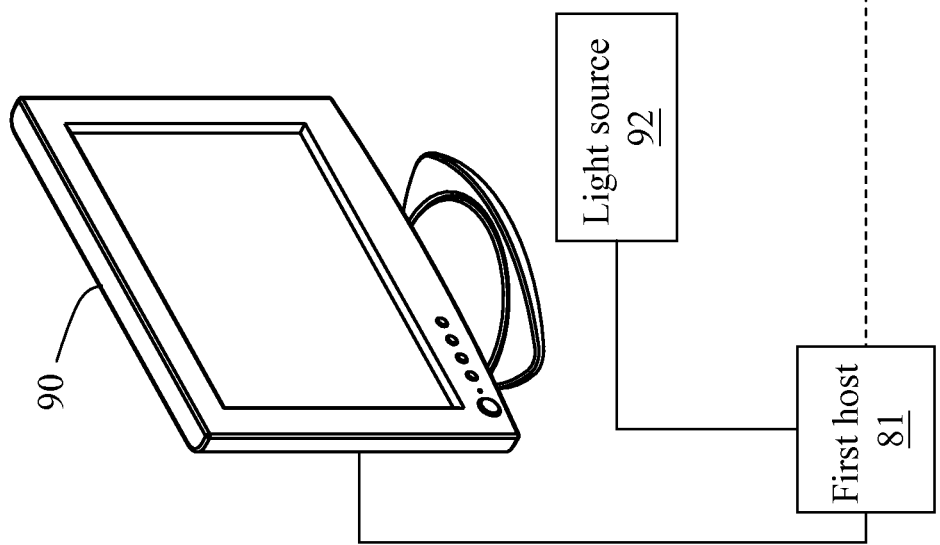
Figure 5:
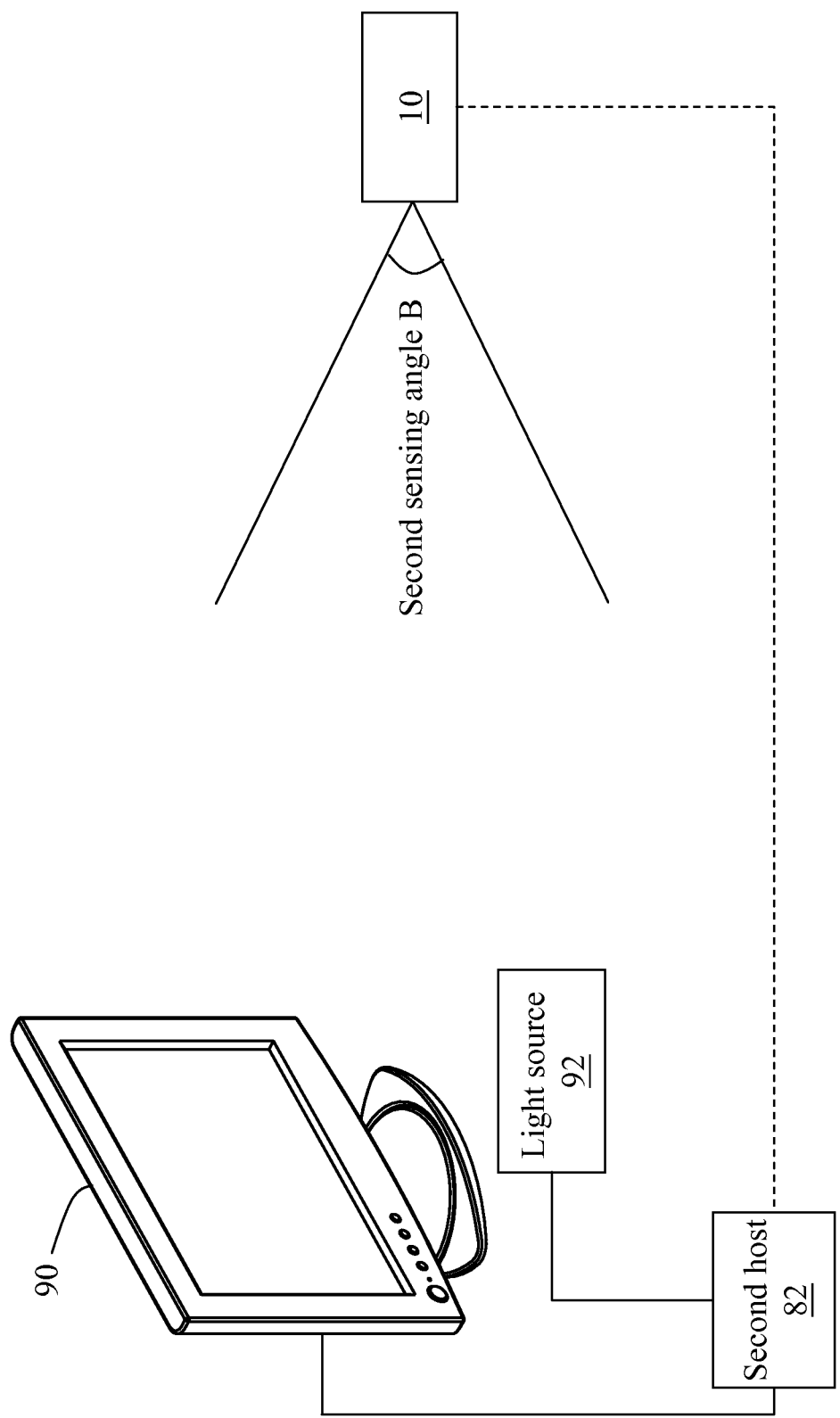
FIG. 5 is a schematic view of a second embodiment of an application of the pointing device of the present invention in an interactive system.

FIG. 4 is a schematic view of a first embodiment of an application of the pointing device of the present invention in an interactive system, and FIG. 5 is a schematic view of a second embodiment of an application of the pointing device of the present invention in an interactive system.

Referring to FIGS. 4 and 5, the interactive system comprises a display screen 90, a host (a first host 81 or a second host 82), a light source 92, and an interactive pointing device 10. The light source 92 is disposed above or below the display screen 90, and comprises a plurality of infrared sources. The interactive pointing device 10 has an image capturing element 20 capable of capturing an optical signal sent by the light source 92, and according to the optical signals captured by the image capturing element 20 of the interactive pointing device 10 capable of switching capture ranges at different time points, the processing unit 30 calculates corresponding coordinates, which are reflected on the display screen 90. The host is divided into a first host 81 with a high resolution and a second host 82 with a low resolution.

When being used in combination with the first host 81, the interactive pointing device 10 has a first sensing angle A, as shown in FIG. 4. When being used in combination with the second host 82, the interactive pointing device 10 has a second sensing angle B, as shown in FIG. 5. The first sensing angle A is larger than the second sensing angle B.

When the interactive pointing device 10 and the second host 82 are used in combination, the processing unit 30 determines that the computer host used in combination is the second host according to a switching signal sent by the computer host. The processing unit 30 selects to output a first coordinate data corresponding to the first host 81 or a second coordinate data corresponding to the second host 82 to the computer host according to the switching signal. The computer host outputs the coordinates onto the display screen 90.

Figure 6:
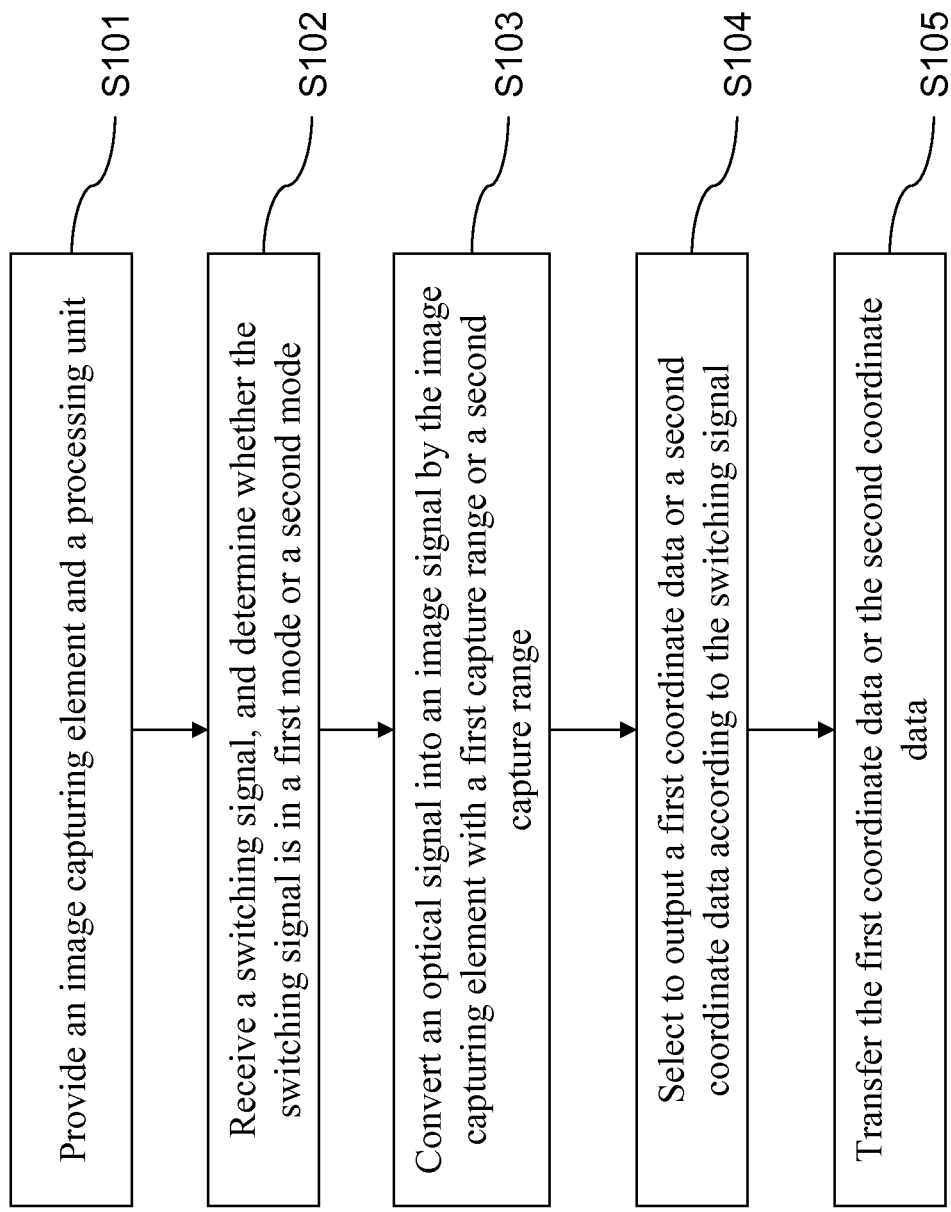
FIG. 6 is a flow chart of a first embodiment of a method for switching capture ranges according to the present invention.

FIG. 6 is a flow chart of a first embodiment of a method for switching capture ranges according to the present invention.

Referring to FIG. 6, in Step S101, an interactive pointing device 10 comprises an image capturing element 20 and a processing unit 30. The image capturing element 20 is used for capturing an optical signal, and outputting an image signal. The processing unit 30 is used for passively receiving a switching signal from a computer host and responding to the switching signal, and responsible for processing and analyzing the image signal from the image capturing element 20.

In Step S102, the processing unit 30 receives the switching signal, and determines whether the switching signal is in a first mode or a second mode.

In Step S103, the processing unit 30 captures an optical signal by using the image capturing element 20. When capturing the optical signal, the image capturing element 20 may operate in a first capture range 60 or a second capture range 70. When the switching signal is in the first mode, the image capturing element 20 captures the optical signal with the first capture range 60, and when the switching signal is in the second mode, the image capturing element 20 captures the optical signal with the second capture range 70.

In Step S104, when the switching signal is in the first mode, the processing unit 30 outputs a first coordinate data according to the image signal captured with the first capture range 60, and when the switching signal is in the second mode, the processing unit 30 outputs a second coordinate data according to the image signal captured with the second capture range 70. The image capturing element 20 compares the image signals output by the image capturing element 20 at different time points, so as to calculate the first coordinate data or the second coordinate data.

In Step S105, the first coordinate data or the second coordinate data is transmitted. Preferably, the first coordinate data or the second coordinate data is transmitted through the signal sending element 50.

Figure 7:
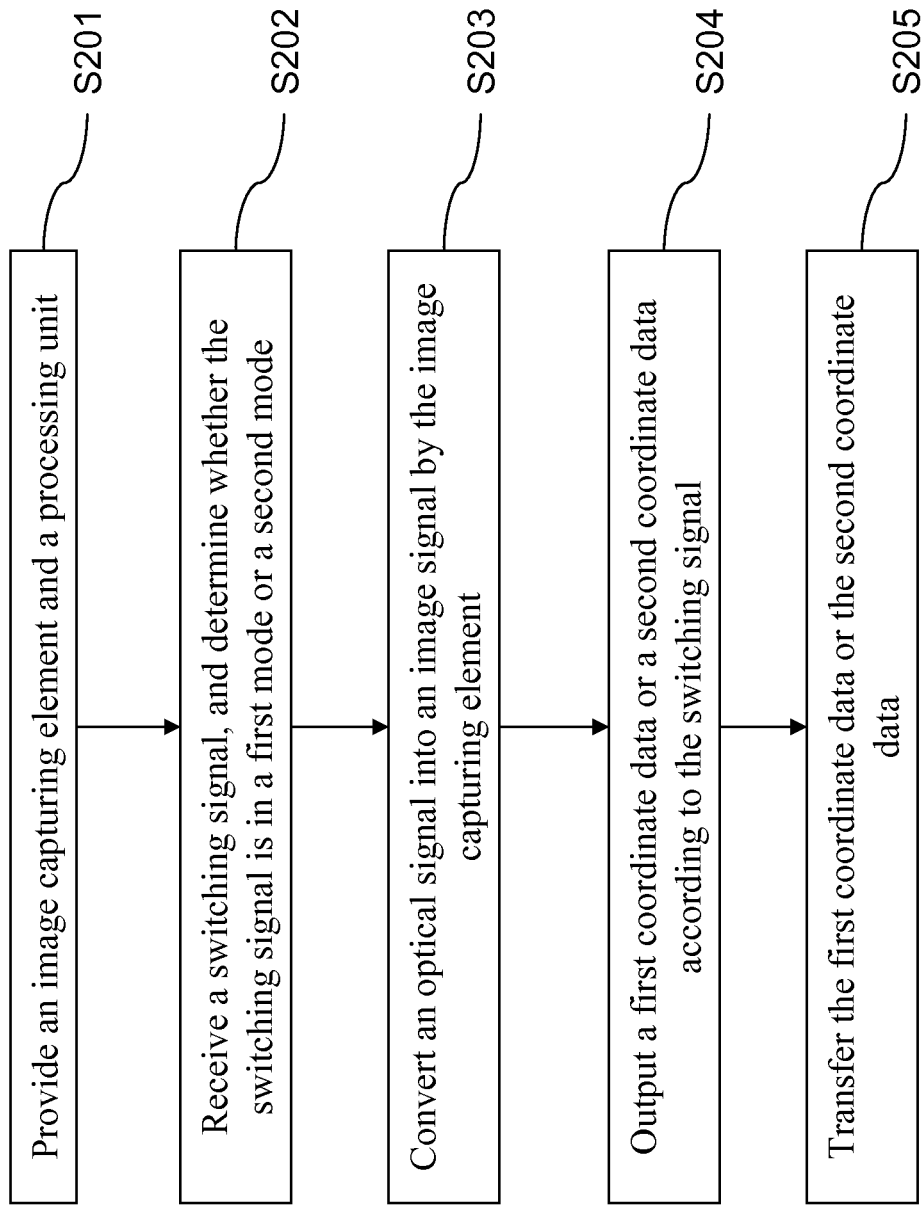
FIG. 7 is a flow chart of a second embodiment of the method for switching capture ranges according to the present invention.

FIG. 7 is a flow chart of a second embodiment of the method for switching capture ranges according to the present invention.

Referring to FIG. 7, in Step S201, an interactive pointing device 10 comprises an image capturing element 20 and a processing unit 30. The image capturing element 20 is used for capturing an optical signal, and outputting an image signal. The processing unit 30 is used for passively receiving a switching signal from a computer host and responding to the switching signal, and responsible for processing and analyzing the image signal from the image capturing element 20.

In Step S202, the processing unit 30 receives the switching signal, and determines whether the switching signal is in a first mode or a second mode.

In Step S203, the image capturing element 20 converts the optical signal into the image signal. The processing unit 30 compares the image signals output by the image capturing element 20 at different time points, so as to calculate a first coordinate data.

In Step S204, when the switching signal is in the first mode, the processing unit 30 outputs the first coordinate data. When the switching signal is in the second mode, the processing unit 30 converts the first coordinate data into a second coordinate data through coordinate numeric conversion, and outputs the second coordinate data.

In Step S205, the first coordinate data or the second coordinate data is transmitted. Preferably, the first coordinate data or the second coordinate data is transmitted through the signal sending element 50.

In view of the above, based on the interactive pointing device capable of switching capture ranges according to the embodiments, during operation, with the image signal captured by the image capturing element, and through the determination about the switching signal and the calculation and conversion of the first coordinates or the second coordinates by an arithmetic unit, the interactive pointing device capable of switching capture ranges is enabled to be operable in hosts with different resolutions.

What is claimed is:

1. An interactive pointing device capable of switching capture ranges, comprising:
   an image capturing element, capable of operating with a first capture range or a second capture range, for capturing an optical signal from an external light source, and outputting an image signal from the optical signal based on the first capture range or the second capture range; and
   a processing unit, for responding to a switching signal,
   wherein when the switching signal is in a first mode, the processing unit controls the image capturing element to capture the optical signal with the first capture range, and the processing unit calculates a first coordinate data based on the image signal from the optical signal, and when the switching signal is in a second mode, the processing unit controls the image capturing element to capture the optical signal with the second capture range, and the processing unit calculates a second coordinate data based on the image signal from the optical signal, wherein the first capture range is corresponding to a first sensing angle, and the second capture range is corresponding to a second sensing angle.

2. The interactive pointing device capable of switching capture ranges according to claim 1, wherein the first capture range comprises the second capture range.

3. The interactive pointing device capable of switching capture ranges according to claim 1, further comprising a signal sending element, for sending the first coordinate data or the second coordinate data.

4. The interactive pointing device capable of switching capture ranges according to claim 1, further comprising a signal receiving element, for receiving the switching signal.

5. The interactive pointing device capable of switching capture ranges according to claim 1, wherein the image capturing element and the processing unit are integrated in a single chip.

6. The interactive pointing device capable of switching capture ranges according to claim 1, wherein the processing unit compares image signals outputted by the image capturing element at different time points, so as to calculate the first coordinate data or the second coordinate data.

7. The interactive pointing device capable of switching capture ranges according to claim 1, wherein the image capturing element is a charge-coupled device (CCD) or a complementary metal-oxide-semiconductor (CMOS).

8. An interactive pointing device capable of switching capture ranges, comprising:
   an image capturing element, for capturing an optical signal from an external light source, and outputting an image signal from the optical signal; and
   a processing unit, for receiving a switching signal,
   wherein when the switching signal is in a first mode, the processing unit calculates a first coordinate data based on the image signal from the optical signal, and when the switching signal is in a second mode, the processing unit calculates a second coordinate data based on the image signal from the optical signal, wherein the optical signal is obtained by the image capturing element with a first sensing angle when the switching signal is in the first mode and is obtained by the image capturing element with a second sensing angle when the switching signal is in the second mode.

9. The interactive pointing device capable of switching capture ranges according to claim 8, wherein when the switching signal is in the second mode, the processing unit calculates the first coordinate data based on the image signal from the optical signal, and then converts the first coordinate data into the second coordinate data.

10. The interactive pointing device capable of switching capture ranges according to claim 8, further comprising a signal sending element, for transmitting the first coordinate data or the second coordinate data.

11. The interactive pointing device capable of switching capture ranges according to claim 8, further comprising a signal receiving element, for receiving the switching signal.

12. The interactive pointing device capable of switching capture ranges according to claim 8, wherein the image capturing element and the processing unit are integrated in a single chip.

13. The interactive pointing device capable of switching capture ranges according to claim 8, wherein the processing unit compares image signals outputted by the image capturing element at different time points, so as to calculate the first coordinate data or the second coordinate data.

14. The interactive pointing device capable of switching capture ranges according to claim 8, wherein the image capturing element is a charge-coupled device (CCD) or a complementary metal-oxide-semiconductor (CMOS).

15. A method for switching capture ranges for use in an interactive pointing device, comprising:
  providing an image capturing element and a processing unit;
  receiving a switching signal, and determining whether the switching signal is in a first mode or a second mode;
  capturing an optical signal with a first sensing angle from an external light source by using the image capturing element when the switching signal is in the first mode;
  capturing the optical signal with a second sensing angle from the external light source by using the image capturing element when the switching signal is in the second mode;
  converting the optical signal into an image signal; and
  when the switching signal is in the first mode, outputting a first coordinate data by the processing unit according to the image signal, and when the switching signal is in the second mode, outputting a second coordinate data by the processing unit according to the image signal.

16. The method for switching capture ranges according to claim 15, wherein the image capturing element has a first capture range or a second capture range, the first capture range comprises the second capture range, when the switching signal is in the first mode, the optical signal is captured with the first capture range and the first coordinate data is outputted according to the optical signal, and when the switching signal is in the second mode, the optical signal is captured with the second capture range and the second coordinate data is outputted according to the optical signal.

17. The method for switching capture ranges according to claim 16, further comprising transmitting the first coordinate data or the second coordinate data.

18. The method for switching capture ranges according to claim 15, wherein when the switching signal is in the second mode, the processing unit outputs the first coordinate data according to the image signal, and converts the first coordinate data into the second coordinate data.

19. The method for switching capture ranges according to claim 18, further comprising transmitting the first coordinate data or the second coordinate data.

20. The method for switching capture ranges according to claim 15, wherein the processing unit compares image signals outputted by the image capturing element at different time points, so as to calculate the first coordinate data or the second coordinate data.

21. An interactive pointing device, comprising:
  an image capturing element, capable of operating in a capture range for capturing an optical signal from an external light source, and outputting an image signal from the optical signal; and
  a processing unit, for responding to a switching signal,
  wherein when the switching signal is in a first mode, the processing unit controls the image capturing element to capture the optical signal with the capture range and calculates a first coordinate data based on the image signal from the optical signal, and when the switching signal is in a second mode, the processing unit controls the image capturing element to capture the optical signal with the capture range and calculates a second coordinate data based on the image signal from the optical signal, wherein the capture range for capturing the optical signal is corresponding to a first sensing angle when the switching signal is in the first mode, and the capture range for capturing the optical signal is corresponding to a second sensing angle when the switching signal is in the second mode.

* * * * *